US009559792B1

United States Patent
Amir-Aslanzadeh et al.

(10) Patent No.: US 9,559,792 B1
(45) Date of Patent: Jan. 31, 2017

(54) BROADBAND IN-PHASE AND QUADRATURE PHASE SIGNAL GENERATION

(71) Applicant: Xilinx, Inc., San Jose, CA (US)

(72) Inventors: Hesam Amir-Aslanzadeh, San Jose, CA (US); Parag Upadhyaya, Los Gatos, CA (US)

(73) Assignee: XILLINX, INC., San Jose, CA (US)

( * ) Notice: Subject to any disclaimer, the term of this patent is extended or adjusted under 35 U.S.C. 154(b) by 0 days.

(21) Appl. No.: 14/841,212

(22) Filed: Aug. 31, 2015

(51) Int. Cl.
*H04L 5/12* (2006.01)
*H04B 17/12* (2015.01)
*H04L 27/26* (2006.01)
*H04L 27/00* (2006.01)

(52) U.S. Cl.
CPC ............ *H04B 17/12* (2015.01); *H04L 27/2631* (2013.01); *H04L 2027/0057* (2013.01)

(58) Field of Classification Search
CPC ...... H04L 27/38; H04L 27/34; H04L 27/3488; H04L 1/0041; H04L 1/0071; H04L 27/2647; H04L 5/0007; H04L 27/2657; H04L 27/2662; H04L 5/0048; H04L 25/4902; H04L 1/0009; H04L 25/49; H04B 3/54
USPC ................ 375/261, 260, 259, 316, 295, 219
See application file for complete search history.

(56) References Cited

U.S. PATENT DOCUMENTS

| 2007/0293163 | A1* | 12/2007 | Kilpatrick | ............ | H04B 1/0483 |
| | | | | | 455/84 |
| 2011/0068843 | A1* | 3/2011 | Kodama | .............. | H03H 7/0153 |
| | | | | | 327/238 |
| 2013/0039444 | A1* | 2/2013 | Porret | .................... | H04B 1/006 |
| | | | | | 375/316 |

OTHER PUBLICATIONS

Dong, Hongfeng, "I-Q Quadrature Generator", ECE1352 Reading Assignment, Nov. 11, 2001, 16 pp.

* cited by examiner

*Primary Examiner* — Zewdu Kassa
(74) *Attorney, Agent, or Firm* — W. Eric Webostad

(57) ABSTRACT

An apparatus, and method therefor, relate generally to broadband IQ generation. In this apparatus, related generally to broadband in-phase and quadrature phase ("IQ") generation, a divider circuit and a polyphase filter circuit are configured for receiving an oscillator output. The polyphase filter circuit is configured for polyphase filtering the oscillator output into a first quadrature output. The divider circuit is configured for dividing the oscillator output into a second quadrature output. A multiplexer circuit is coupled to the divider circuit and the polyphase filter circuit and configured for selecting either the first quadrature output or the second quadrature output as an IQ output based on a bandwidth of the oscillator output.

20 Claims, 7 Drawing Sheets

US 9,559,792 B1

BROADBAND IN-PHASE AND QUADRATURE PHASE SIGNAL GENERATION

FIELD OF THE INVENTION

The following description relates to integrated circuit devices ("ICs"). More particularly, the following description relates to broadband in-phase signal and quadrature signal generation for an IC.

BACKGROUND

In-phase and quadrature phase ("IQ") signals are orthogonal to one another. Orthogonal signals are used in modern wireline and wireless communication systems. These communication systems involve increasingly higher frequencies and broader bandwidths.

Hence, it is desirable and useful to provide IQ generation for such broadband use at high frequencies.

SUMMARY

An apparatus relates generally to in-phase and quadrature phase ("IQ") generation. In such an apparatus, a divider circuit and a polyphase filter circuit are configured for receiving an oscillator output. The polyphase filter circuit is configured for polyphase filtering the oscillator output into a first quadrature output. The divider circuit is configured for dividing the oscillator output into a second quadrature output. A multiplexer circuit is coupled to the divider circuit and the polyphase filter circuit and configured for selecting either the first quadrature output or the second quadrature output as an IQ output based on a bandwidth of the oscillator output.

Another apparatus relates generally to in-phase and quadrature phase ("IQ") generation. In such an apparatus, a polyphase filter is configured for receiving an oscillator output and performing polyphase filtering of the oscillator output into a first quadrature output for a combined range of a first bandwidth and a second bandwidth. A divider is configured for receiving the oscillator output and dividing the oscillator output into a second quadrature output for a divided-down range of the combined range. A first multiplexer is coupled to the divider and the polyphase filter and configured for selecting either the first quadrature output or the second quadrature output as an IQ output based on a bandwidth of the oscillator output. A local oscillator is configured for generating a first oscillation output for the first bandwidth and a second oscillation output for the second bandwidth. A second multiplexer is coupled to the local oscillator and configured for selecting either the first oscillation output or the second oscillation output as the oscillator output. Clock tree lines are coupled to the first multiplexer for receiving the IQ output as quadrature clock signals, and a transceiver is coupled to the clock tree lines for receiving the quadrature clock signals.

A method relates generally to in-phase and quadrature phase ("IQ") generation. In such a method, an oscillator output is generated. The oscillator output is polyphase filtered with a polyphase filter circuit into a first quadrature output. The oscillator output is divided with a divider circuit into a second quadrature output. Either the first quadrature output or the second quadrature output is selected by a multiplexer circuit for providing an IQ output based on a bandwidth of the oscillator output.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

Figure 1:
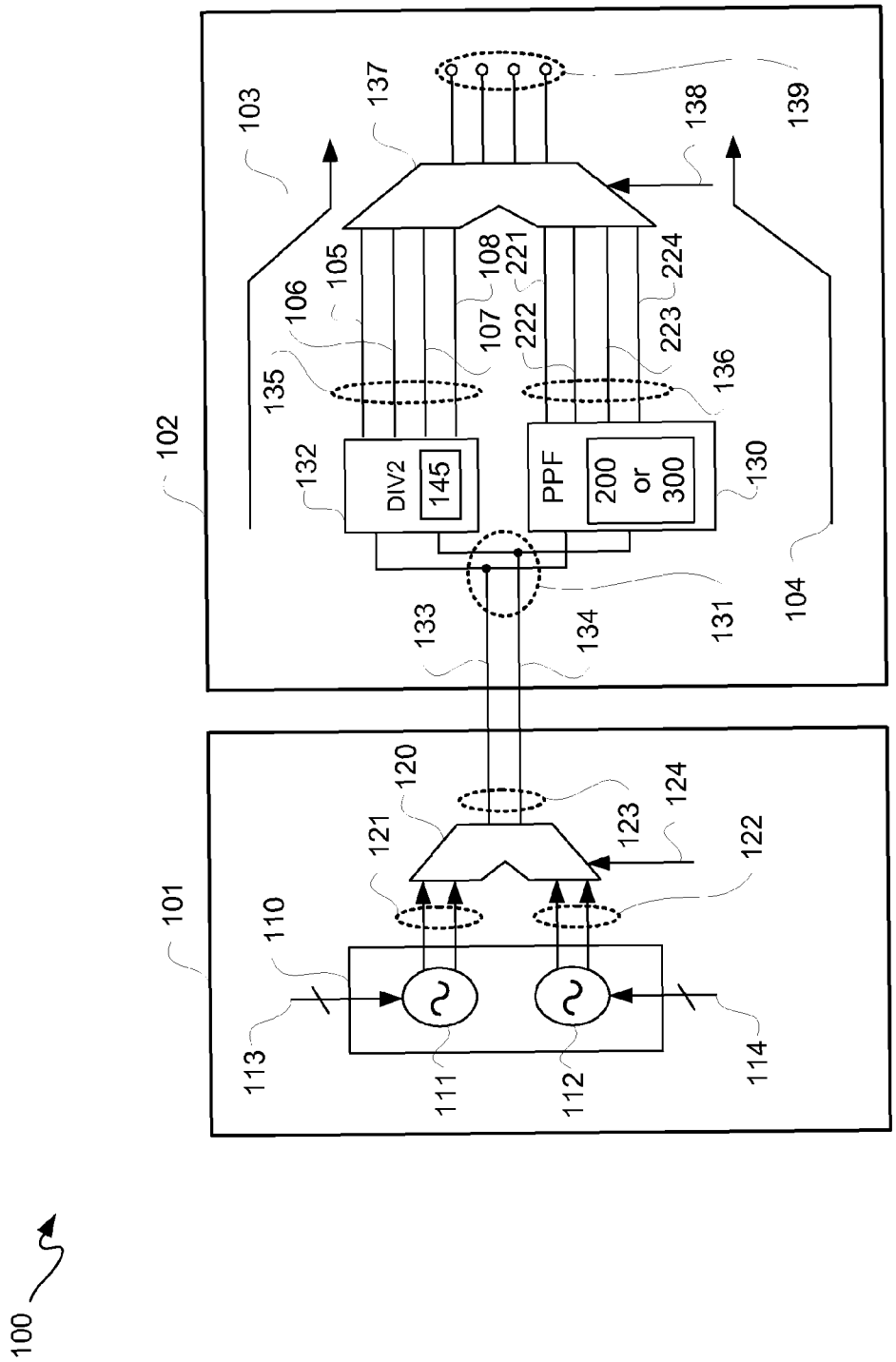
FIG. 1 is a block diagram depicting an exemplary in-phase and quadrature phase ("IQ") generator.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

An oversampled receiver architecture may use in-phase ("I") and quadrature-phase ("Q") clock signals for data path clocking and/or equalization. For broadband serial communication, such as a gigabit transceiver supporting line rates from approximately 0.5 Gb/s to approximately 32.75 Gb/s, for example, such as for a serializer-deserialier ("SERDES") application, broadband IQ generation and clock distribution may be used as described herein. Though the following description is generally in terms of line rates for purposes of clarity by way of example, such description likewise applies to both wireline and wireless communication system, as well as other applications where orthogonal signals are used.

To cover such a broadband for IQ generation, a hybrid approach is used. A divider block is used for line rates less than approximately 16.375 gigabits per second ("Gb/s") in an example implementation. Such a divider block may have a wideband common mode logic ("CML") divide-by-two frequency divider to generate I and Q signal phases. For line rates higher than approximately 16.375 Gb/s for an example implementation, a divider block may not work. For example, voltage-controlled oscillators ("VCOs") may operate only up to 16.375 GHz. To address a limitation of a local oscillator, a broadband polyphase filter may be used as described herein for IQ generation covering line rates beyond that supported by a local oscillator and a divider, such line rates may be higher than approximately 16.375 Gb/s. In an example implementation described herein an upper limit of such operation may be approximately 32.75 Gb/s.

Polyphase filters are conventionally used in narrowband applications due to several limitations of polyphase filters. As described below, limitations of polyphase filters are addressed for broadband use. By dividing up the broadband spectrum, a polyphase filter may be used for only a portion of a broadband spectrum. This apportioning of spectrum may be used to address a narrowband limitation of a polyphase filter. Additional limitations of a polyphase filter include IQ error due to harmonic distortion and large attenuation over an operating range, and these additional limitations may be addressed as described below in additional detail.

With the above general understanding borne in mind, various configurations for broadband IQ generation are generally described below.

FIG. 1. is a block diagram depicting an exemplary in-phase and quadrature phase ("IQ") generator 100. IQ generator 100 includes an oscillator circuit 101 coupled to an IQ generation circuit 102.

Oscillator circuit 101 includes a local oscillator ("LO") circuit or sub-circuit ("block") 110 coupled to a multiplexer block 120. LO block 110 may be for providing an oscillation output 121 for a first bandwidth and for providing an oscillation output 122 for a second bandwidth.

In this example, LO block 110 includes a voltage controlled oscillator ("VCO") 111 for providing oscillation output 121 and a VCO 112 for providing oscillation output 122. VCO 111 and VCO 112 in this example respectively are a first inductance-capacitance VCO ("LCVCO") and a second LCVCO. Along those lines, a tank circuit may be used for providing an LCVCO. However, other types oscillator circuits and/or of types of oscillators may be used. For example, linear or harmonic oscillators, ring oscillators, or other types of oscillators may be used in LO block 110. Furthermore, rather than two oscillators, a single oscillator and a frequency divider may be used to provide oscillation outputs 121 and 122.

Control signaling 113 may be used for setting VCO 111, and control signaling 114 may be used for setting VCO 112. For accuracy and stability, a VCO may be configured as a narrowband circuit, so having two VCOs with different bandwidths may in combination be used to provide an overall wideband output. In this example, control signaling 113 is for setting VCO 111 to support a first bandwidth of approximately 13 gigahertz ("GHz") to approximately 16.375 GHz, and control signaling 114 is for setting VCO 112 to support a second bandwidth of approximately 8 GHz to approximately 13 GHz. However, these or other bandwidths may be used, as may vary from application-to-application. Generally, IQ generator 100 is configured for supporting a wide bandwidth, namely a bandwidth of approximately an octave ("2x") range, where x is the low frequency component of such range for an application. In this example, x is approximately 8 GHz.

For an LCVCO, such a circuit is an autonomous oscillator for providing an analog output. Along those lines, control signaling 113 and 114 may include a digital input for coarse frequency tuning control via an adjustable array of capacitors and may include a DC voltage for fine frequency tuning control via a varactor. Therefore, actual output of each of VCOs 111 and 112 may be a specific frequency within a bandwidth supported by such VCO. For purposes of clarity by way of example and not limitation, outputs of VCOs 111 and 112 are described herein with reference to supported bandwidths, as IQ generator 100 is configured for supporting a wide bandwidth.

VCO 111 provides an analog oscillation output 121, and VCO 112 provides an analog oscillation output 122. In this example, bandwidths of oscillation outputs 121 and 122 partially overlap one another in order to reliably provide a continuous combined range. In this example, a continuous combined range of approximately 8 GHz to approximately 16.375 GHz is provided; however, other ranges may be used in other implementations. Having a wide bandwidth from a continuous combined range may be useful for both wireless and wireline transmitters and/or receivers (herein collectively and singly referred to as "transceivers"). For this example, bandwidths of oscillation outputs 121 and 122 partially overlap one another to guarantee that an overall bandwidth is continuous, which in this example is an overlap of approximately 1 GHz with respect to a central portion of such bandwidths of oscillation outputs 121 and 122. Generally, approximately 10 percent or more of an overall bandwidth may be an overlapped region. However, in another implementation, bandwidths of outputs 121 and 122 may abut one another or may be gapped apart from one another.

In this example, oscillation outputs 121 and 122 respectively from VCOs 111 and 112 are differential signals. However, in another implementation, single-ended signals may be used. Moreover, oscillation outputs 121 and 122 may have a same phase, such as for a single phase clock, for generation of an IQ output 139.

Oscillation outputs 121 and 122 are respectively input to a multiplexer block 120 or other buffer-driver block. A control select signal 124 may be provided to multiplexer block 120 for selecting either oscillation output 121 or 122 for output from multiplexer block 120 as an oscillator output 123.

A user or application may set control select signal 124 according to a line rate to be used. In this example implementation, generally oscillation output 121 may be selected as oscillator output 123 from multiplexer block 120 for line rates above approximately 16.375 Gb/s, and oscillation output 122 may be selected as oscillator output 123 from multiplexer block 120 for line rates below approximately 16.375 Gb/s. More particularly, in this example implementation, oscillation output 121 may be selected as oscillator output 123 from multiplexer block 120 for line rates from approximately 16.375 Gb/s to approximately 32.75 Gb/s, and oscillation output 122 may be selected as oscillator output 123 from multiplexer block 120 for line rates from approximately 4 Gb/s to approximately 16.375 Gb/s.

Oscillator output 123, like oscillation outputs 121 and 122, is a differential signal in this example. Oscillator output 123 supports a wide bandwidth as a combined bandwidth of overlapped bandwidths of oscillation outputs 121 and 122.

To recapitulate, an oscillator circuit 101 having a LO block 110 coupled to a multiplexer block 120 has been described as providing an oscillator output 123. However, it should be understood that this is just an example implementation of an oscillator circuit 101 for sourcing an oscillator output 123 for an IQ generation circuit 102. Accordingly, other types of oscillator circuits may be used for oscillator circuit 101 for providing an oscillator output 123 having a wide bandwidth, where such wide bandwidth may be apportioned for "high" and "low" line rates by an IQ generation circuit 102, as described below in additional detail.

IQ generation circuit 102 includes an input port 131 for receiving an oscillator output 123 operating in either a first bandwidth or a second bandwidth. Again, such first bandwidth has a higher frequency range than such second bandwidth; such second bandwidth has a lower frequency range than such first bandwidth; and such first and second bandwidth in combination provide a combined range of operation. In this example, input port 131 is a differential input port with a positive-side voltage rail 133 and a negative-side voltage rail 134. Even though the example of two oscillators feeding a multiplexer is used, two or more oscillators and a multiplexer or multiplexer tree may be used for signal generation to cover a range greater than octave range, namely greater than a 2x range.

IQ generation circuit 102 further includes a divider block 132 and a polyphase filter ("PPF") block 130 coupled to input port 131 for receiving oscillator output 123. Positive-side voltage rail 133 is coupled for input to both divider block 132 and PFF block 130, and likewise negative-side voltage rail 134 is coupled for input to both divider block 132 and PFF block 130. PFF block 130 may be for polyphase filtering oscillator output 123 into a quadrature output 136 for operation in a combined range. Divider block 132 may be for dividing oscillator output 123 into a quadrature output 135 for a divided-down range of such a combined range. Divider block 132 may include a CML divide-by-two frequency divider 145, which may effectively be a two stage ring oscillator, where each stage provides a 90 degree phase shift for providing I and Q phases.

IQ generation circuit 102 may further include a multiplexer block 137 for selecting either quadrature output 135 or quadrature output 136 as an IQ output 139 responsive to a control select signal 138. In this example, divider block 132 includes a CML divide-by-two divider 145 for providing a divided-down range of approximately 4 GHz to approximately 8.1875 GHz.

Though divider block 132 and PPF block 130 are commonly coupled to input port 131 for receiving oscillator output 123, which in this example implementation is a differential signal, a user or application selects either an upper path 103 or a lower path 104 for operation. Multiplexer block 137 may include a static multiplexer selection of either of paths 103 or 104 for an application. A multiplexer or multiplexers of multiplexer block 137 may be toggled to switch between applications, but generally for operation within an application, a selection via control select signal 138 is static for such application. Likewise, control select signal 124 may be toggled between applications, but is static for operation within an application after a selection is made. In this example implementation, quadrature output 136 along lower path 104 is for a line rate in a range of approximately 16.375 Gb/s to approximately 32.75 Gb/s, and quadrature output 135 along upper path 103 is for a line rate in a range of approximately 4 Gb/s to approximately 16.375 Gb/s.

Voltage outputs of a divide-by-two divider 145 of divider block 132 may be used to provide a quadrature output 135 having a positive-side in-phase voltage signal ("Ip") 105, a negative-side in-phase voltage signal ("In") 106, a positive-side quadrature voltage signal ("Qp") 107, and a negative-side quadrature voltage signal ("Qn") 108 (collectively "IQ output signals" or quadrature output 135). In this example implementation, divider block 132 may have a CML divide-by-two divider 145; however, in other implementations, other types of dividers may be used. Along those lines, even though a divide-by-two divider is used, values other than 2 may be used for frequency division of an incoming oscillator output 123.

Voltage outputs of filters of a PPF of PPF block 130 may be used to provide a quadrature output 136 having a positive-side in-phase voltage signal ("Ip") 221, a negative-side in-phase voltage signal ("In") 222, a positive-side quadrature voltage signal ("Qp") 223, and a negative-side quadrature voltage signal ("Qn") 224 (collectively "IQ output signals"). Along those lines, PPF block 130 may include a constant-phase type of PPF 200 or a constant-amplitude type of PPF 300.

Figure 2:
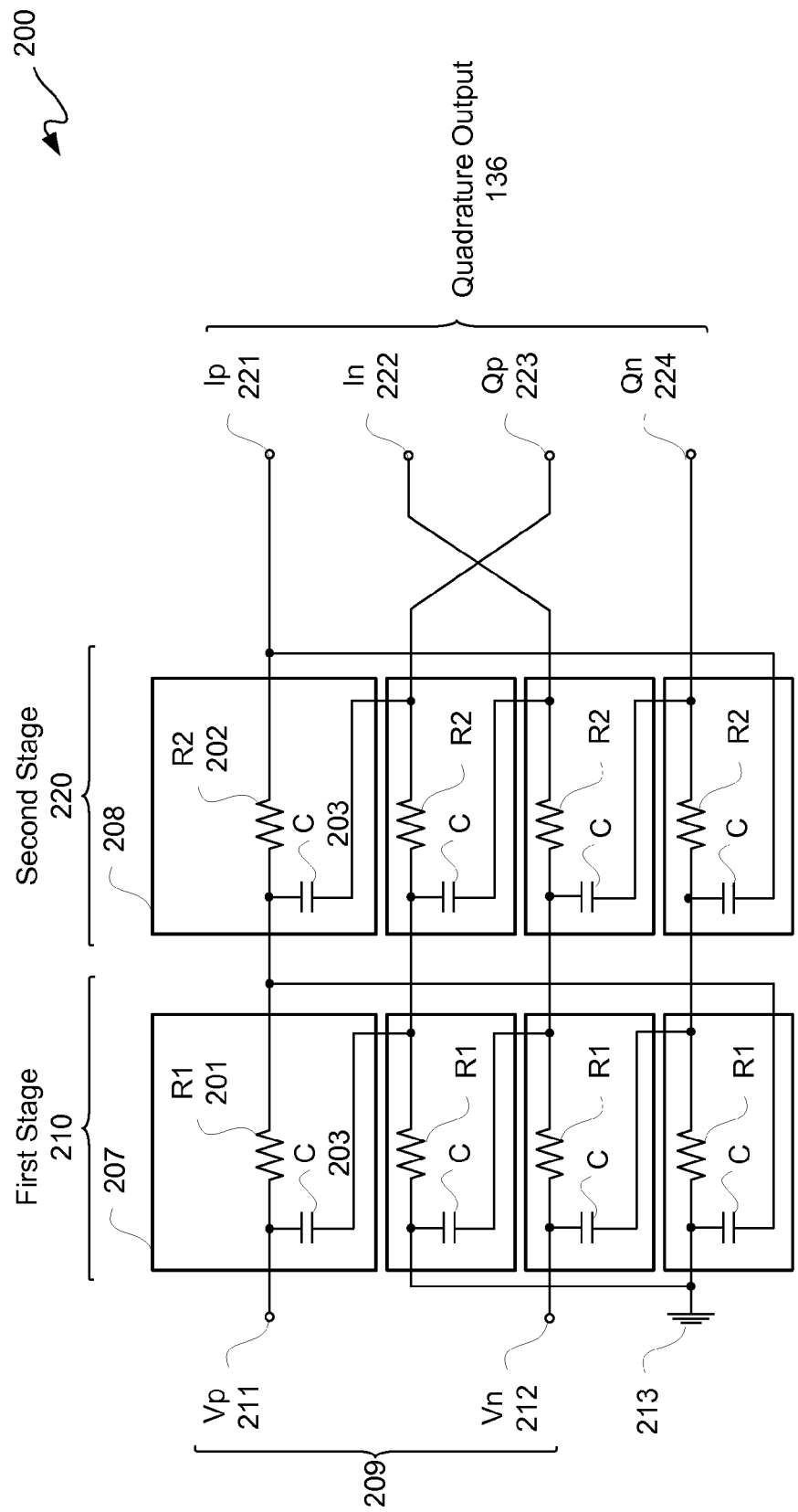
FIG. 2 is a circuit diagram depicting an exemplary constant-phase type of polyphase filter ("PPF"), which may be included in the PPF block of FIG. 1.

FIG. 2 is a circuit diagram depicting an exemplary constant-phase type of PPF 200, which may be included in PPF block 130. PPF 200 is a two-stage PPF. Constant-phase PPF 200 includes a first resistance-capacitance ("RC") circuit ("first stage") 210 coupled to a second RC circuit ("second stage") 220. Even though a two-stage PPF 200 is illustratively depicted, in another implementation more than two stages may be implemented for PPF 200.

In this example, PPF 200 receives a positive-side rail voltage signal ("Vp") 211 and a negative-side rail voltage signal ("Vn") 212 of a buffered output 209. A two or more stage PPF 200 may be coupled for receiving a buffered output 209 within a PPF block 130. Along those lines, oscillator output 123 amplified by a linear amplifier of PPF block 130, as described below in additional detail, may be used to provide a buffered output 209. PPF 200 may filter and phase shift such a buffered output 209 for providing a quadrature output 136.

Vp 211 may be an input voltage of a low-pass "R1C" filter ("low-pass filter") 207 of a first stage 210 of PPF 200. First stage 210 in this example implementation includes a bank of four low-pass filters 207. Another of such low-pass filters 207 of first stage 210 may receive Vn 212 as an input voltage, and the remaining two low-pass filters 207 of first stage 210 may be coupled to a ground 213, as ground reference input voltage. Resistors 201 of low-pass filters 207 may be selected for a pole for first stage 210, namely a cutoff frequency of each low-pass filter 207 may equal $1/(2\pi R1C)$, where a same capacitance value is used for both first stage 210 and second stage 220 low-pass filters. In another implementation, resistance R may be the same for first and second stages and different capacitances C1 and C2 may be respectively for such first and second stages to define poles. Yet in another implementation, a mix of different resistances and capacitances may be used with respect to such first and second stages to define poles.

Output voltages of low-pass filters 207 of first stage 210 are respectively coupled as input voltages of low-pass filters 208 of second stage 220. Second stage 220 in this example implementation includes a bank of four low-pass filters 208. Resistance R2 of resistors 202 of low-pass filters 208 may be selected for a pole for second stage 220, namely a cutoff frequency of each low-pass filter 208 may equal $1/(2\pi R2C)$. In this implementation, resistances R1 and R2 of resistors 201 and 202 may be selected for a same capacitance C of capacitors 203 for poles respectively of stages 210 and 220.

Voltage outputs of low-pass filters 208 may be used to provide a quadrature output 136 having a positive-side in-phase voltage signal ("Ip") 221, a negative-side in-phase voltage signal ("In") 222, a positive-side quadrature voltage signal ("Qp") 223, and a negative-side quadrature voltage signal ("Qn") 224 (collectively "IQ output signals"). For constant-phase PPF 200, IQ output signals 221 through 224 generally maintain a constant phase with respect to one another. In other words, ideally Ip 221 and In 222 are in-phase with one another and 90 degrees out-of-phase with respect to Qp 223 and Qn 224, and ideally Qp 223 and Qn 224 are in-phase with one another. However, for PPF 200, Ip 221 and In 222, and likewise Qp 223 and Qn 224, only have equal magnitudes at frequencies of poles of PPF 200.

Generally, first stage 210 has a first pole, and second stage 220 has a second pole different from the pole of first stage 210. Along those lines, an RC network of first stage 210 may be used to produce a shift in signal phases of 45 degrees in one direction, and a CR network of second stage 220 may be used to produce a shift in signal phase of 45 degrees in an opposite direction as that of such first stage 210, so as to provide a 90 degree phase shift for a quadrature output 136.

For PPF 200, frequency range may be as wide as an octave ("2x"). Poles of each of stages 210 and 220 may be selected such that over process, voltage, and/or temperature ("PVT") variations magnitude differences are within a tolerance range, as may vary from application-to-application. Along those lines, a pole of stage 210 and a pole of stage 220 may each be selected to be in the middle of a frequency range, so for both "slow" and "fast" corners of PVT, in-phase and quadrature phase relationships among IQ output signals 221 through 224 are maintained, and magnitude mismatches between IQ output signals 221 through 224 are within a tolerance range, as may vary from application-to-application. Thus, a pole of first stage 210 may be at least proximate to the middle of a first bandwidth, and a pole of second stage 220 may be at least proximate to the middle of a second bandwidth, where such first and second bandwidths in combination provide a combined bandwidth, as previously described herein.

As a two-stage constant-phase type of PPF 200 is used in this exemplary implementation, a well-known PPF 200 has been described, though not in unnecessary detail for purposes of clarity and not limitation. However, a well-known constant magnitude type PPF may be used in PPF block 130 instead of PPF 200.

Figure 3:
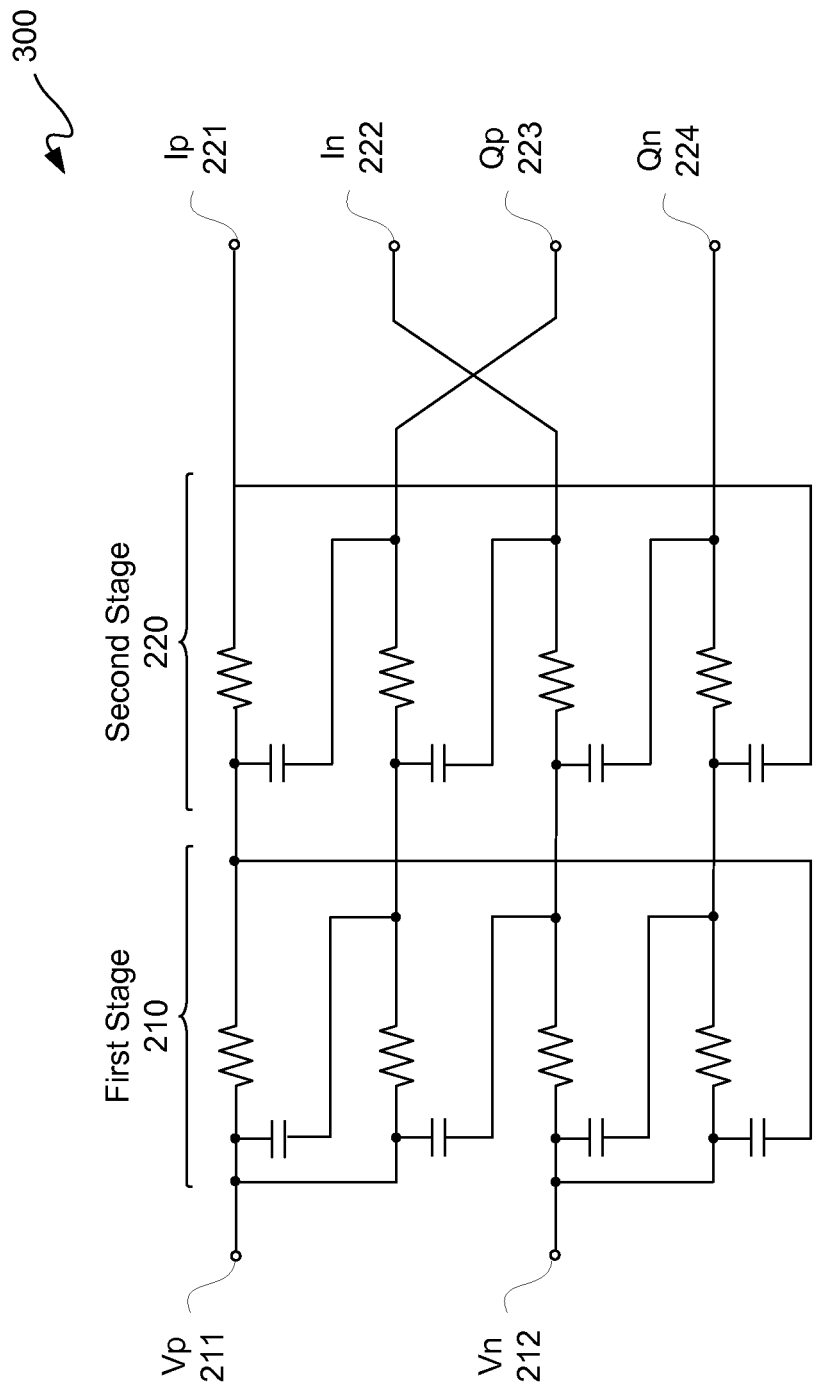
FIG. 3 is a circuit diagram depicting an exemplary constant-amplitude type of PPF, which may be included in the PPF block of FIG. 1.

FIG. 3 is a circuit diagram depicting an exemplary constant-amplitude type of PPF 300, which may be included in PPF block 130 of FIG. 1. PPF 300 is a well-known two-stage PPF. Even though PPF 300 includes two stages, more than two stages may be used.

PPF 300, like PPF 200, receives a Vp 211 and a Vn 212. However, PPF 300 does not use a ground reference voltage input. Rather, Vp 211 and Vn 212 are generally applied to both positive and negative sides in PPF 300 for first and second RC stages 210 and 220; whereas, for PPF 200, generally Vp 211 is only applied to a positive side for generating Ip and Qp, and generally Vn 212 is only applied to a negative side for generating In and Qn.

PPF 300 may provide a quadrature output 136 having IQ output signals including an Ip 221, an In 222, a Qp 223, and a Qn 224. However, for a constant-magnitude PPF 300, IQ output signals 221 through 224 generally have equal magnitudes with respect to one another. In other words, ideally Ip 221 and In 222 have same magnitudes with respect to one another, and ideally Qp 223 and Qn 224 have same magnitudes with respect to one another. For PPF 300, Ip 221 and In 222, and likewise Qp 223 and Qn 224, such signal pairs only have orthogonal phases at frequencies of poles of stages of PPF 300.

As a two-stage constant-magnitude type of PPF 300 is a well-known PPF, it has not been described in unnecessary detail for purposes of clarity and not limitation.

PPFs may have a significant amount of attenuation. For example, a two-stage PPF may attenuate approximately 10 to 12 dB of signal in order to provide IQ output signals 221 through 224. Along those lines, between an oscillator source output and a PPF input, an amplifier may be used for amplifying and buffering prior to polyphase filtering by a PPF.

An oscillator output 123 may be driven prior to polyphase filtering with a low-distortion amplifier in order to have an oscillating signal output therefrom at least substantially closely resemble a sinusoidal wave. A conventional CML buffer, which has a "banana-shaped" output, may not be suitable for driving a polyphase filter input, as such a banana-shaped output may result in distortion due to other than first order harmonics lack of orthogonality and/or changes in magnitude of such second and higher order harmonics. In other words, a conventional CML buffer is too nonlinear, namely has too large a harmonic distortion, for this application.

Figure 4:
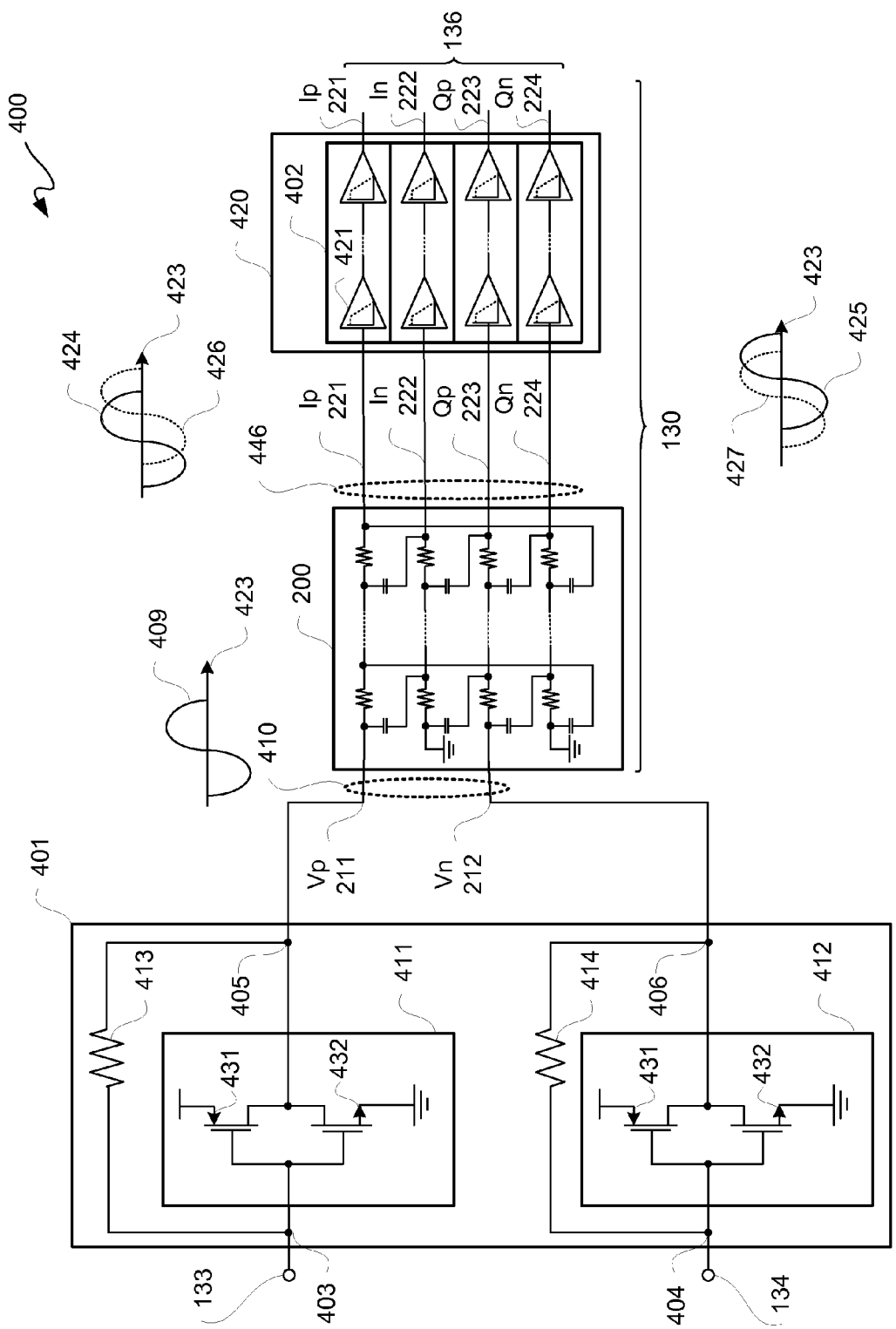
FIG. 4 is a schematic diagram depicting an exemplary PPF block, which may be included in the IQ generator of FIG. 1.

FIG. 4 is a schematic diagram depicting an exemplary PPF block 400. PPF block 400 may be used as PPF block 130 for IQ generator 100 of FIG. 1.

PPF block 400 includes a linear amplifier 401, a PPF 200, and a clock distribution network 420. Linear amplifier includes a first CMOS inverter 411, a second CMOS inverter 412, a first feedback resistor 413, and a second feedback resistor 414. Linear amplifier 401 may have a low output resistance for driving PPF 200 with a differential buffered output 410 from linear amplifier 401.

Input nodes 403 and 404 respectively of CMOS inverters 411 and 412 are coupled to positive-side voltage rail 133 and a negative-side voltage rail 134, respectively, for receiving a differential oscillator output 123 for linearly amplifying such differential oscillator output 123 for providing a buffered output 410. Buffered output 410 includes a Vp 211 and a Vn 212.

Buffered output 410 may be a sine wave, as generally indicated as sine wave 409 along a time x-axis 423. Accordingly, it should be appreciated that digital inverters 411 and 412 may be used for buffering analog inputs, namely a positive-side voltage rail 133 and a negative-side voltage rail 134, respectively, are sinusoidal positive-side and negative-side voltages. PMOS transistors 431 and NMOS transistors 432 of inverters 411 and 412 may be biased and/or configured for operation in their respective linear regions at frequencies described herein for not converting sinusoidal inputs to square or pseudo-square wave outputs, but rather allowing such sine wave forms to be maintained at both inputs and outputs of inverters 411 and 412.

Output nodes 405 and 406 respectively of CMOS inverters 411 and 412 are coupled to provide a Vp 211 and a Vn 212 of a buffered output 410, respectively, to PPF 200, as previously described. Feedback resistor 413 is coupled between output node 405 and input node 403. Feedback resistor 414 is coupled between output node 406 and input node 404.

Even though a single PMOS transistor and a single NMOS transistor are illustratively depicted for each of CMOS inverters 411 and 412, other configurations of inverters may be used in other applications. Moreover, each of CMOS inverters 411 and 412 may be a self-biased inverter.

PPF 200 may output polyphase filtered-phase shifted IQ output signals 221 through 224 responsive to Vp 211 and Vn 212 of buffered output 410 as a pre-low-pass filtered IQ output 446. Again, even though PPF 200 is illustratively depicted as having two filter stages, in another implementation more than two filter stages may be used. At sufficiently high frequencies, such as those described herein for operation of PPF 200, phase error may be reduced in contrast to operation of PPF 200 at low frequencies.

Polyphase filtered-phase shifted IQ output signals 221 through 224 may be respectively input to at least one low-pass filter 402. In this example implementation, four clock distribution chains of buffers 421 of a clock distribution network 420 provide respective low-pass filters 402 for filtering IQ output signals 221 through 224, respectively. Such low-pass filters 402 may be used to sequentially filter unwanted higher order harmonics in IQ output signals 221 through 224 to provide additional IQ phase accuracy for IQ output signals 221 through 224 of IQ output 136, namely low-pass filtered IQ output signals 221 through 224. In other words, low-pass filtered IQ output signals 221 through 224 may be reduced to only their fundamental first order harmonics for providing an exact quadrature output. In another implementation, one or more bandpass filters 402 may be used instead of or in addition to low-pass filters 402.

For example, if sine waves 424 and 425 are fundamental first order harmonics for I and Q signals respectively, then second and possibly higher order harmonics, generally represented as sine waves 426 and 427 respectively for I and Q signals, may introduce phase error. Though sine waves 426 and 427 are depicted, in actuality such higher order harmonics may have sharper edges than sine waves. Along those lines, a sequence of low-pass filters 402 may be used to sequentially filter such second and possibly higher order harmonics to reduce low-pass filtered IQ output signals 221 through 224 to only their fundamental first order harmonics, or with at least enough filtering to have sufficiently low harmonic distortion as to be used as a quadrature output for high-speed operation.

PPF block 400 may be for generation of orthogonal clock phases in a broadband communication system. Though a wireline SERDES application is described hereinbelow, PPF block 400 may be used in any application involving generation of orthogonal signals for broadband use.

In this exemplary implementation, low-pass filtering using a clock distribution network 420 is performed before multiplexer block 137, and thus multiplexer block 137 is downstream of clock distribution network 420. However, as described below in additional detail, both quadrature outputs 135 and 136 may be provided to multiplexer block 137 followed by low-pass filtering output of multiplexer block 137 with downstream low-pass filters.

Figure 5:
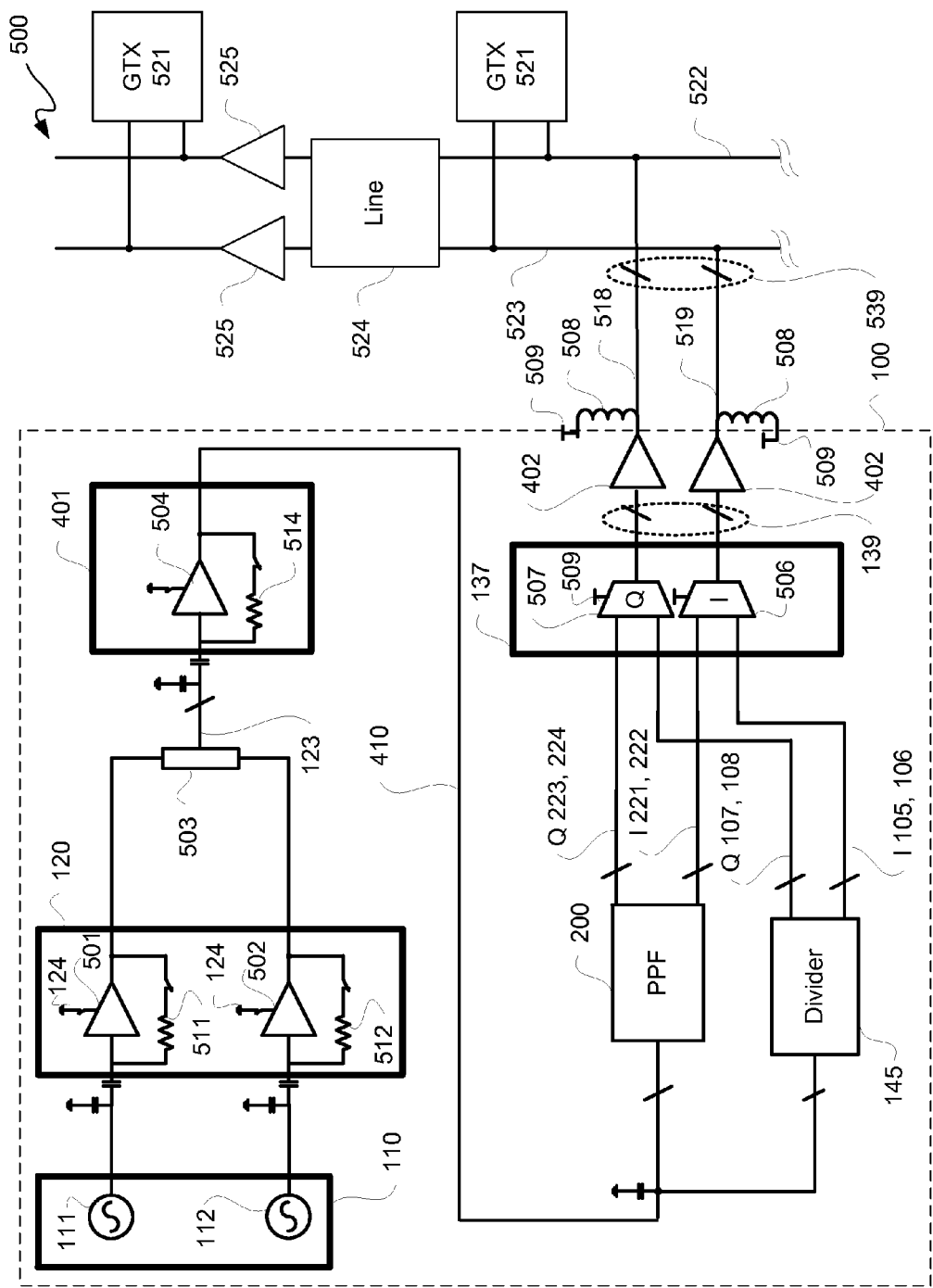
FIG. 5 is a schematic diagram depicting a communication system, which may include the IQ generator of FIG. 1.

FIG. 5 is a schematic diagram depicting a communication system 500. Communication system 500 includes an IQ generator 100 coupled to one or more gigabit transceivers 521. As much of the description for IQ generator 100 is the same, generally same description is not repeated for purposes of clarity and not limitation.

VCOs 111 and 112 of LO block 110 provide respective inputs to CMOS inverters 501 and 502 of multiplexer block 120. For enhancing linearity of outputs of inverters 501 and 502, feedback resistors 511 and 512 are respectively coupled input-to-output in parallel with inverters 501 and 502. Inverters 501 and 502 may be tri-stateable responsive to opposite states of control select signal 124 for providing a multiplexer function. Outputs of inverters 501 and 502 may be provided to an interconnect block 503 for input to provide oscillator output 123 as differential input to a differential inverter 504 of linear amplifier 401. A feedback resistor 514 of linear amplifier 401 may be coupled input-to-output in parallel with differential inverter 504.

A differential buffered output 410 may be provided to each of PPF 200 and divide-by-two divider 145. Qp and Qn signals 223, 224 output from PPF 200 may be provided as a selectable input to a Q multiplexer 507 of multiplexer block 137, and Qp and Qn signals 107, 108 output from divide-by-two divider 145 may be provided as another selectable input to Q multiplexer 507 of multiplexer block 137. Ip and In signals 221, 221 output from PPF 200 may be provided as a selectable input to a I multiplexer 506 of multiplexer block 137, and Ip and In signals 105, 106 output from divide-by-two divider 145 may be provided as another selectable input to I multiplexer 506 of multiplexer block 137.

Either a quadrature output set of Ip, In, Qp, and Qn signals output from PPF 200 for a first bandwidth or a quadrature output set of Ip, In, Qp, and Qn signals output from divide-by-two divider 145 for a second bandwidth may be output from multiplexers 506 and 507, such as responsive to a control select signal 138 of FIG. 1. Ip, In, Qp, and Qn signals output from multiplexer block 137 may be a pre-low-pass filtered IQ output 139. Qp and Qn signals output from multiplexer 507 may be input to a differential low-pass filter 402, and Ip and In signals output from multiplexer 506 may be input to another differential low-pass filter 402.

Along those lines, in this example implementation, both outputs from divide-by-two divider 145 and PPF 200 may be low-pass filtered for removing second and higher order harmonics for example; however, such low-pass filtering of outputs from divide-by-two divider 145 may not be nearly as compelling for removing harmonic distortion to reduce phase error as low-pass filtering of outputs from PPF 200. An IQ output 539 output from low-pass filters 402 may generally have been low-pass filtered for removal of at least one harmonic having a higher order than first harmonics thereof.

Output from a differential low-pass filter 402 may be selected Qp and Qn phase signals 518, and output from another differential low-pass filter 402 may be corresponding Ip and In phase signals 519. IQ signals 518 and 519 may be an IQ output 539 of IQ generator 100 for providing as quadrature clock signals.

Additionally, IQ signals 518 and 519 may respectively be inductively coupled to a line common mode voltage level ("avtt") through respective inductors 508 coupled between outputs of differential low-pass filters 402 and an avtt bus 509. Likewise, multiplexers 506 and 507 may be coupled to an avtt bus 509 for level shifting outputs therefrom to an avtt level. However, in other implementation, an inductive peaking stage for driving large loads may not be used. For example, an RC or an RLC buffer may be used.

IQ signals 518 and 519 may be respectively coupled to clock tree lines 522 and 523 for distributing IQ signals 518 and 519 as quadrature clock signals to one or more gigabit transceivers ("GTXs") 521. GTXs 521 may be for separate communications channels. GTXs 521 may be of an FPGA or other IC.

Clock tree lines 522 and 523 may be coupled to one or more line drivers 524, as well as respectively coupled to CML buffers 525, for such clock signal distribution. Moreover, more than one IQ generator 100 may be coupled to a clock tree network for providing quadrature clock signal to transceivers.

Figure 6:
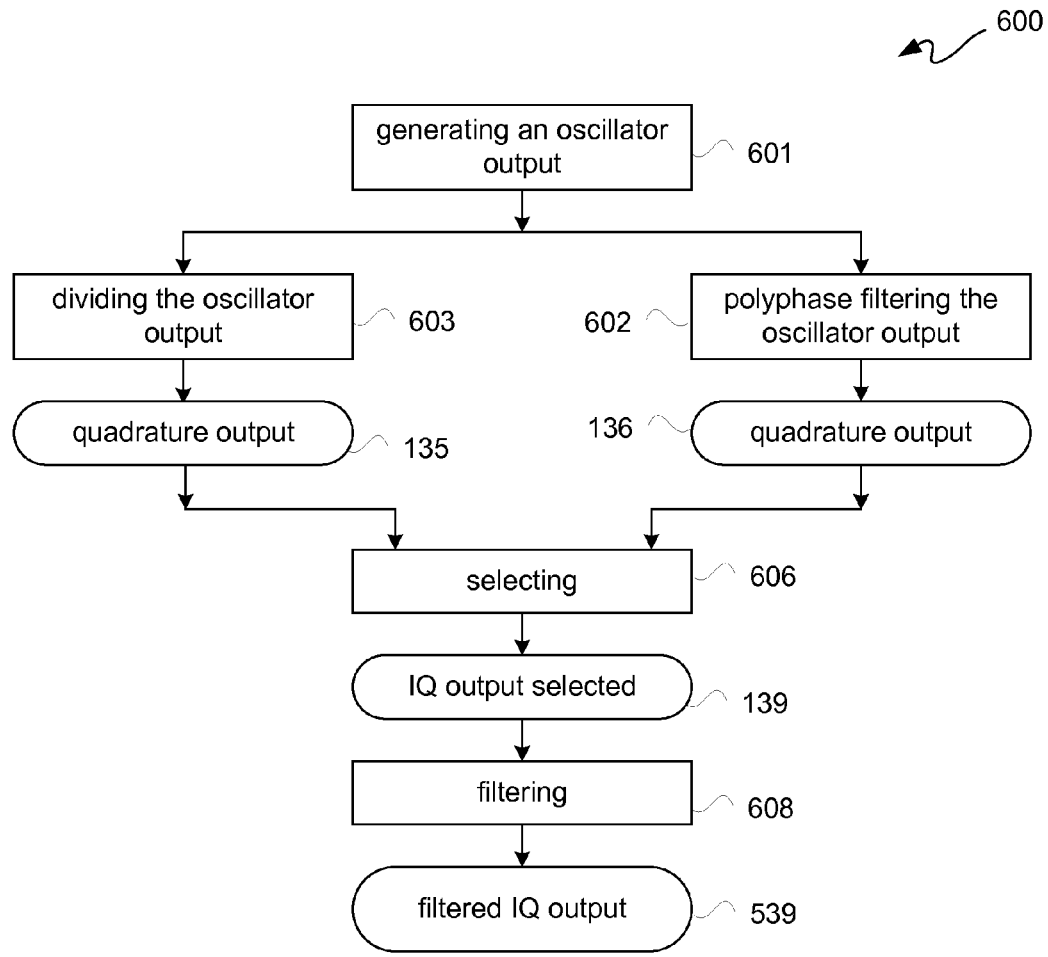
FIG. 6 is a flow diagram depicting an exemplary IQ generation flow, which may be for the IQ generator of FIG. 1.

FIG. 6 is a flow diagram depicting an exemplary IQ generation flow 600. IQ generation flow 600 may be for IQ generator 100 of FIG. 1. FIG. 6 is further described with simultaneous additional reference to FIG. 1.

At 601, an oscillator output 123 may be generated having a first bandwidth or a second bandwidth. Again, such first bandwidth may have a higher frequency range than such second bandwidth; such second bandwidth may have a lower frequency range than such first bandwidth, and such first bandwidth and such second bandwidth in combination may provide a combined range.

At 602, oscillator output 123 may be polyphase filtered with a polyphase filter block 130 into a quadrature output 136 for such a combined range. Again, polyphase filtering may include RC and CR filtering along with phase shifting +/−45 degrees for providing a 90 degree phase shift between I and Q signals. In parallel with polyphase filtering at 602, at 603 oscillator output 123 may be divided with a divider block 132 into a quadrature output 135 for a divided-down range of such combined range.

At 606, either quadrature output 136 or quadrature output 135 may be selected for output by a multiplexer block 137 for providing an IQ output 139. In an implementation, at 608 IQ output 139 may be low-pass filtered to provide a low-pass filtered IQ output 539. In another implementation, band-pass filtering or a combination of band-pass and low-pass filtering may be used. Low-pass filtering of IQ output 139 may be for removal of at least one harmonic having a higher order than first harmonics of I and Q signals of IQ output 139 for providing IQ output 539.

Figure 7:
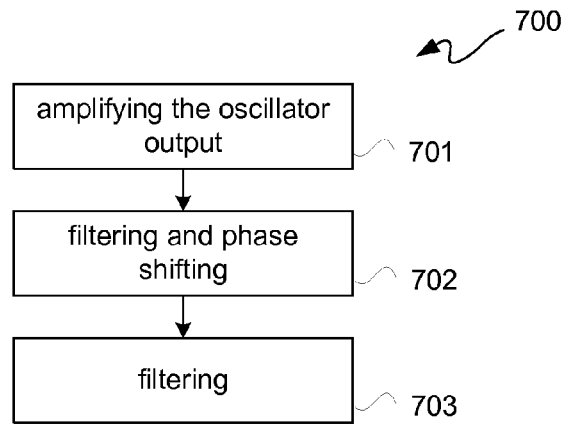
FIG. 7 is a flow diagram depicting an exemplary polyphase filtering flow, which may be used for a polyphase filtering operation in the IQ generation flow of FIG. 6.

FIG. 7 is a flow diagram depicting an exemplary polyphase filtering flow 700, which may be used for polyphase filtering operation 602 of IQ generation flow 600 of FIG. 6. FIG. 7 is further described with simultaneous additional reference to FIGS. 1 and 4.

At 701, an oscillator output 124 may be amplified by a linear amplifier 401 for providing a buffered output 410. At 702, buffered output 410 may be filtered and phase shifted by at least a two stage polyphase filter 200 for providing a filtered-phase shifted IQ output 446. At 703, at least one harmonic of filtered-phase shifted IQ output 446 may be low-pass filtered for filtering, which may include but is not limited to filtering out, a higher order than a first harmonic of IQ signals thereof with at least one low-pass filter.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 8:
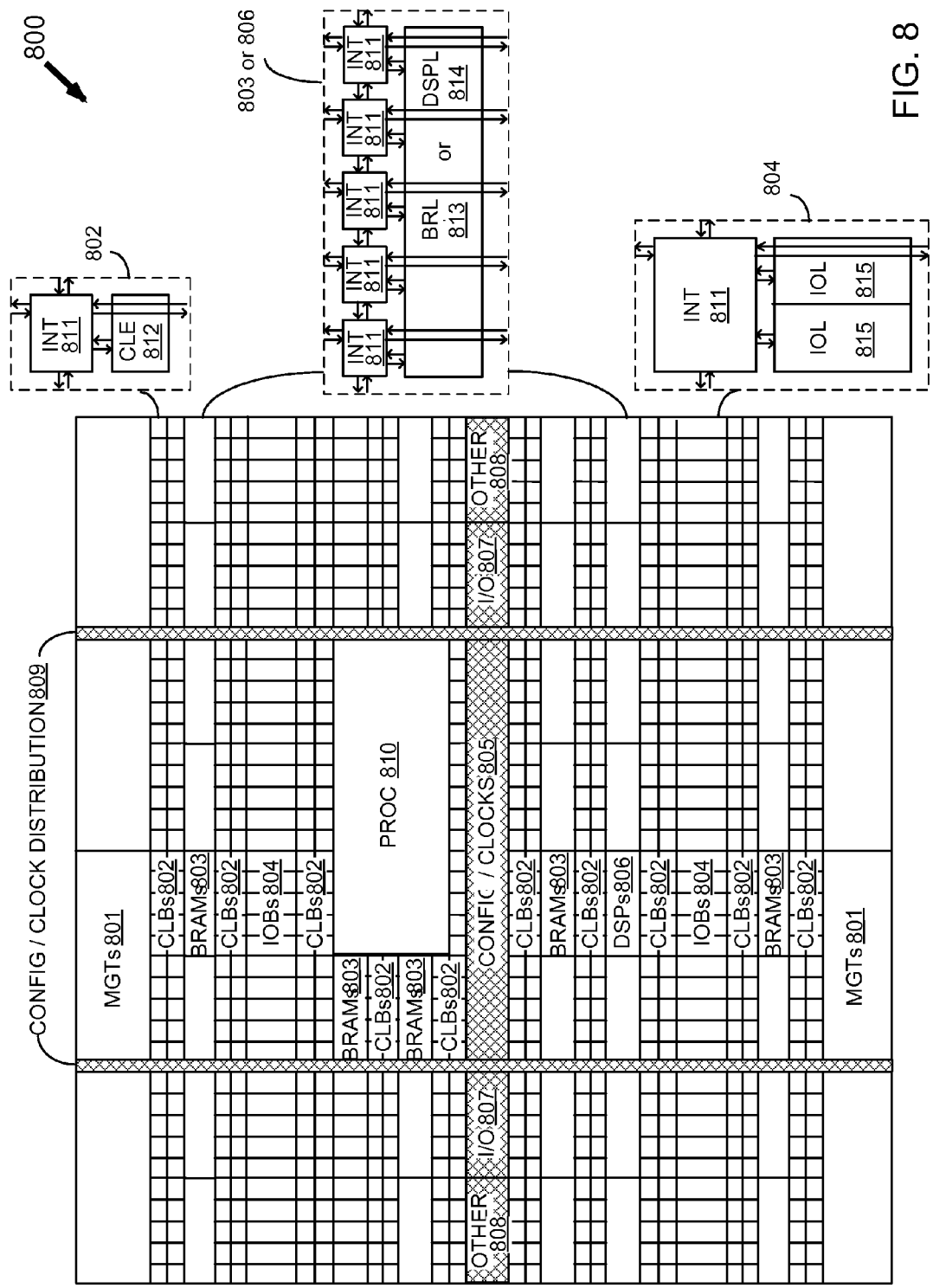
FIG. 8 is a simplified block diagram depicting an exemplary columnar Field Programmable Gate Array ("FPGA") architecture.

As noted above, advanced FPGAs can include several different types of programmable logic blocks in the array. For example, FIG. 8 illustrates an FPGA architecture 800 that includes a large number of different programmable tiles including multi-gigabit transceivers ("MGTs") 801, configurable logic blocks ("CLBs") 802, random access memory blocks ("BRAMs") 803, input/output blocks ("IOBs") 804, configuration and clocking logic ("CONFIG/CLOCKS") 805, digital signal processing blocks ("DSPs") 806, specialized input/output blocks ("I/O") 807 (e.g., configuration ports and clock ports), and other programmable logic 808 such as digital clock managers, analog-to-digital converters, system monitoring logic, and so forth. Some FPGAs also include dedicated processor blocks ("PROC") 810.

In some FPGAs, each programmable tile includes a programmable interconnect element ("INT") 811 having standardized connections to and from a corresponding interconnect element in each adjacent tile. Therefore, the programmable interconnect elements taken together implement the programmable interconnect structure for the illustrated FPGA. The programmable interconnect element 811 also includes the connections to and from the programmable logic element within the same tile, as shown by the examples included at the top of FIG. 8.

For example, a CLB 802 can include a configurable logic element ("CLE") 812 that can be programmed to implement user logic plus a single programmable interconnect element ("INT") 811. A BRAM 803 can include a BRAM logic element ("BRL") 813 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 806 can include a DSP logic element ("DSPL") 814 in addition to an appropriate number of programmable interconnect elements. An 10B 804 can include, for example, two instances of an input/output logic element ("IOL") 815 in addition to one instance of the programmable interconnect element 811. As will be clear to those of skill in the art, the actual I/O pads connected, for example, to the I/O logic element 815 typically are not confined to the area of the input/output logic element 815.

In the pictured embodiment, a horizontal area near the center of the die (shown in FIG. 8) is used for configuration, clock, and other control logic. Vertical columns 809 extending from this horizontal area or column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic. For example, processor block 810 spans several columns of CLBs and BRAMs.

Note that FIG. 8 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 8 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. An apparatus for in-phase and quadrature phase ("IQ") generation, comprising:
  a linear amplifier configured for amplifying an oscillator output to provide an amplified oscillator output;
  a polyphase filter circuit configured for receiving the amplified oscillator output and performing polyphase filtering of the amplified oscillator output into a first quadrature output;
  the polyphase filter circuit comprising a plurality of filter circuit stages configured for filtering the amplified oscillator output into the first quadrature output;
  a divider circuit configured for receiving the amplified oscillator output from a common input coupling with the polyphase filter circuit and dividing the amplified oscillator output into a second quadrature output; and
  a multiplexer circuit coupled to the divider circuit and the polyphase filter circuit and configured for selecting either the first quadrature output or the second quadrature output as an IQ output based on a bandwidth of the oscillator output.

2. The apparatus according to claim 1, wherein:
  the first quadrature output has either a first bandwidth or a second bandwidth;
  the first bandwidth has a higher frequency range than the second bandwidth;
  the second bandwidth has a lower frequency range than the first bandwidth;
  the first bandwidth and the second bandwidth in combination provide a combined range;
  the polyphase filter circuit is configured for polyphase filtering the amplified oscillator output into the first quadrature output for the combined range; and
  the divider circuit is configured for dividing the amplified oscillator output into the second quadrature output for a divided-down range of the combined range.

3. The apparatus according to claim 2, wherein the first bandwidth and the second bandwidth partially overlap one another for generating the combined range.

4. The apparatus according to claim 1, wherein the multiplexer circuit is a first multiplexer circuit, the apparatus further comprising:
  a local oscillator circuit configured for generating a first oscillation output for a first bandwidth and a second oscillation output for a second bandwidth, the first quadrature output having either the first bandwidth or the second bandwidth; and
  a second multiplexer circuit coupled to the local oscillator circuit and configured for selecting either the first oscillation output or the second oscillation output as the oscillator output.

5. The apparatus according to claim 4, wherein the local oscillator circuit comprises:
  a first voltage controlled oscillator configured for generating the first oscillation output; and
  a second voltage controlled oscillator configured for generating the second oscillation output.

6. The apparatus according to claim 4, wherein the first oscillation output and the second oscillation output are for a single phase clock.

7. The apparatus according to claim 4, wherein:
  the first oscillation output is for line rates above approximately 16.375 gigabits per second ("Gb/s"); and
  the second oscillation output is for line rates below approximately 16.375 Gb/s.

8. The apparatus according to claim 4, wherein:
  the divider circuit and the polyphase filter circuit are commonly coupled to the second multiplexer circuit for receiving the amplified oscillator output; and
  the amplified oscillator output is a differential signal.

9. The apparatus according to claim 1, wherein the polyphase filter circuit has a constant-phase polyphase filter.

10. The apparatus according to claim 1, wherein the polyphase filter circuit has a constant-amplitude polyphase filter.

11. The apparatus according to claim 1, wherein:
  the polyphase filter circuit has a first resistance-capacitance ("RC") circuit and a second RC circuit;
  the first RC circuit has a first pole; and
  the second RC circuit has a second pole different from the first pole.

12. The apparatus according to claim 11, wherein:
the first pole is proximate to or at the middle of the first bandwidth; and
the second pole is proximate to or at the middle of the second bandwidth.

13. The apparatus according to claim 1, wherein the multiplexer circuit is a first multiplexer circuit, the apparatus further comprising:
a second multiplexer circuit coupled to the linear amplifier to provide the oscillator output thereto.

14. The apparatus according to claim 1, wherein the plurality of filter circuit stages comprise low-pass filters configured for sequential filtering of harmonics of the first quadrature output.

15. The apparatus according to claim 1, wherein the divider circuit has a common-mode logic divide-by-two divider.

16. An apparatus for in-phase and quadrature phase ("IQ") generation, comprising:
a linear amplifier configured for amplifying an oscillator output to provide an amplified oscillator output;
a polyphase filter circuit configured for receiving the amplified oscillator output and performing polyphase filtering of the amplified oscillator output into a first quadrature output for a combined range of a first bandwidth and a second bandwidth;
the polyphase filter circuit comprising a plurality of filter circuit stages configured for filtering the amplified oscillator output into the first quadrature output;
a divider configured for receiving the amplified oscillator output from a common input coupling with the polyphase filter circuit and dividing the amplified oscillator output into a second quadrature output for a divided-down range of the combined range;
a first multiplexer coupled to the divider and the polyphase filter and configured for selecting either the first quadrature output or the second quadrature output as an IQ output based on a bandwidth of the oscillator output;
a local oscillator configured for generating a first oscillation output for the first bandwidth and a second oscillation output for the second bandwidth;
a second multiplexer coupled to the local oscillator and configured for selecting either the first oscillation output or the second oscillation output as the oscillator output;
clock tree lines coupled to the first multiplexer for receiving the IQ output as quadrature clock signals; and
a transceiver coupled to the clock tree lines for receiving the quadrature clock signals.

17. The apparatus according to claim 16, wherein:
the first quadrature output has either the first bandwidth or the second bandwidth;
the first bandwidth has a higher frequency range than the second bandwidth; and
the second bandwidth has a lower frequency range than the first bandwidth.

18. A method for in-phase and quadrature phase ("IQ") generation, comprising:
generating an oscillator output;
amplifying the oscillator output with a linear amplifier to provide an amplified oscillator output;
polyphase filtering the amplified oscillator output with a polyphase filter circuit into a first quadrature output;
the polyphase filtering comprising filtering the amplified oscillator output into the first quadrature output with a plurality of filter circuit stages of the polyphase filter circuit;
dividing the amplified oscillator output with a divider circuit into a second quadrature output in parallel with the polyphase filtering for providing the first quadrature output and the second quadrature output in parallel; and
selecting either the first quadrature output or the second quadrature output by a multiplexer circuit for providing an IQ output based on a bandwidth of the oscillator output.

19. The method according to claim 18, wherein:
the oscillator output has a first bandwidth or a second bandwidth;
the first bandwidth has a higher frequency range than the second bandwidth;
the second bandwidth has a lower frequency range than the first bandwidth;
the first bandwidth and the second bandwidth in combination providing a combined range;
the first quadrature output is for the combined range; and
the second quadrature output is for a divided-down range of the combined range.

20. The method according to claim 18, wherein the polyphase filtering further comprises:
phase shifting by the polyphase filter circuit the amplified oscillator output for generating a filtered-phase shifted output; and
filtering a second or higher order harmonic of the filtered-phase shifted output with a low-pass or bandpass filter to provide the first quadrature output.

* * * * *